United States Patent Office 2,890,539
Patented June 16, 1959

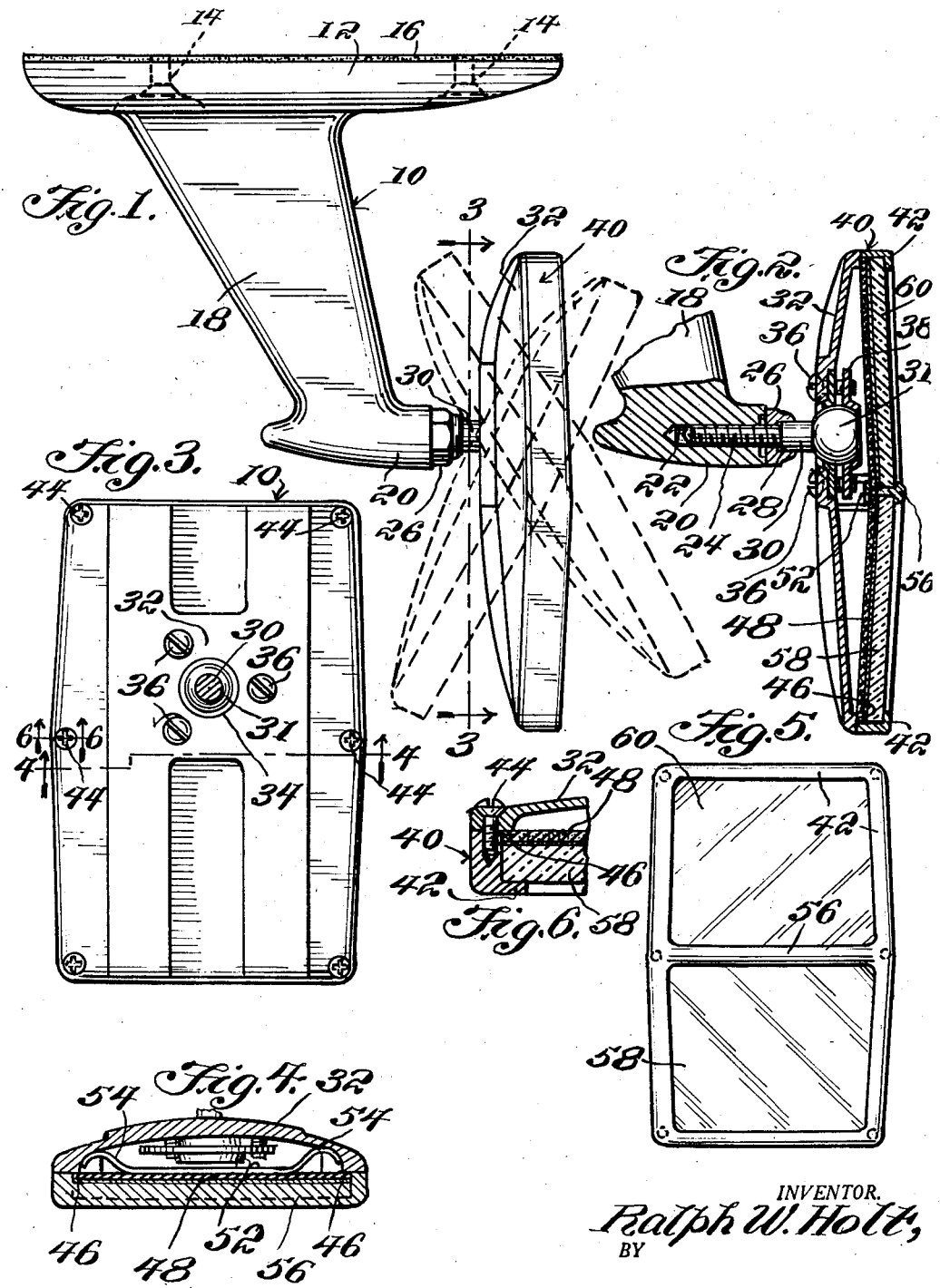

2,890,539

REAR VIEW MIRROR MOUNT

Ralph W. Holt, Denver, Colo.

Application April 12, 1955, Serial No. 500,777

5 Claims. (Cl. 40—152)

This invention relates to rear view mirrors for vehicles, such as trucks, passenger cars, and the like.

Among important objects of the invention are to provide a generally improved rear view mirror, having angularly related mirror elements to provide the vehicle operator with improved vision so far as cars passing his vehicle are concerned; to provide an improved mounting for said angularly related mirror elements; to simplify construction; and to provide a positive separation means for the angularly related mirrors, so that the operator of the vehicle will not see the same car twice in a single reflective plate, or in side-by-side plates under circumstances that prevent ready knowledge by the vehicle operator as to the location of the passing vehicle.

It is not broadly new to provide, in a rear view mirror, angularly related reflective elements, for the purpose of improving the vision of a vehicle operator so far as is concerned a trailing vehicle pulling out of the driving lane of the lead vehicle into a passing lane. However, heretofore it has been generally proposed that the angularly related reflective elements not have a positive separation, and this causes the elements to blend into one another, so that a ready detection by the vehicle operator of the exact location of the passing vehicle cannot be obtained. Obviously, it is of the utmost importance under the circumstances indicated that a vehicle operator know immediately the location of the passing vehicle, since only a few seconds are permitted for the vehicle operator to reach the necessary conclusion, so that he will not himself move into the passing lane while being passed by another vehicle.

Another object of importance is to provide, in a mirror of the type referred to, means cooperating with the reflective element separation means, that will engage both of the reflective elements, and urge the same into the desired angular relationship.

Still another object of importance is to provide a mirror of the type referred to, which will be particularly efficient in use, rugged, trouble free in operation, and will yet be capable of being attractively made so as to add measurably to the overall appearance of the vehicle on which it is mounted.

Other objects and advantages will become apparent from a consideration of the following description and the appended claims in combination with the accompanying drawings, wherein:

Figure 1 is a top plan view of a rear view mirror formed according to the present invention, the dotted lines showing different positions of the means supporting the angularly related reflective elements;

Figure 2 is a sectional view taken longitudinally through the movable portion of the mirror and the associated support portion;

Figure 3 is a sectional view on line 3—3 of Figure 1;

Figure 4 is a transverse sectional view through the mirror frame and associated backing plate, substantially on line 4—4 of Figure 3;

Figure 5 is a front view of the mirror frame on a reduced scale; and

Figure 6 is a greatly enlarged, fragmentary, detail sectional view on line 6—6 of Figure 3.

The reference numeral 10 has been applied generally to a rear view mirror formed according to the present invention, and said mirror including a base 12 formed with spaced, countersunk, screw-receiving openings 14 adapted to receive screws or the like, not shown, whereby said base can be fixedly secured to an associated supporting surface, such as the side of an automotive vehicle, not shown. Preferably, a relatively soft gasket 16 is interposed between the surface of the vehicle body and the base 12, to prevent damage to the vehicle body.

Integrally or otherwise rigidly formed with the base, and projecting outwardly therefrom, is an elongated support arm 18 of streamlined cross section, tapering in a direction away from the base and angled slightly toward the rear of the base. Integrally formed upon the outer end of the support arm 18 is a tapered or streamlined head 20, having an axial, threaded socket 22 opening upon the flat, rear surface of the head to receive a threaded stud 24. A nut 26 is applied to the stud, and has a recess 28 receiving a cylindrical enlargement 30 formed upon the outer end of the stud. Engagement 30, at its outer end, is integral with a part-spherical ball element 31, engageable in a center opening formed in a ball element support plate 34, the edge portion of the center opening being shaped as a segment of a sphere for universal movement of the ball element 31 relative to the plate 34. Plate 34 has triangularly spaced openings of smooth-walled formation, receiving screws 36, said screws being engaged in corresponding, threaded openings formed in the marginal portion of an inner ball element clamping plate 38 spaced a short distance inwardly from the plate 34 and having a center opening receiving the ball element, the edge portion of the center opening of plate 38 also having a segmentally spherical ball-element-engaging flange.

The screws 36 pass through smooth-walled, countersunk openings formed in a dished backing plate 32, said backing plate 32 having a large opening of circular configuration receiving the ball-element-engaging flange of the plate 34 as shown in Figure 2. The backing plate 32 is thus connected fixedly to the plates 34, 38, for universal movement therewith upon the ball element, thus permitting the backing plate to be shifted to any of various positions such as those shown in full and dotted lines in Figure 1.

In the illustrated example, though not necessarily, the backing plate is of approximately rectangular outer configuration, with the axis of universal movement thereof being disposed closer to one end than to the other end thereof, as shown in Figure 3, said axis of universal movement being, however, close to the midlength point of the backing plate.

Supported against the periphery of the backing plate is a mirror frame 40, the outer configuration of which is a substantial duplicate of that of the backing plate, and said mirror frame has, extending about that edge thereof remote from the backing plate, a relatively narrow, inwardly projecting retaining flange or lip 42 extending over the full circumference of the mirror frame.

In the corners of the backing plate, openings are formed receiving screws 44, threaded into corresponding openings of the mirror frame, to fixedly connect the mirror frame to the backing plate.

As shown to particular advantage in Figures 4 and 5, the marginal portion of the backing plate, that is, the surface of the backing plate engaged by the frame 40, is greater in width than the thickness of the frame, thus defining a marginal, internal shoulder 46 upon the backing plate, against which seats a felt gasket 48 overlying the full area of the backing plate. The flexible, felt gasket 48 is disposed against the back of a pair of reflective mirror elements to be described hereinafter, and for the purpose of urging the mirror elements into engagement with the flange 42, there is provided (see Figure 4) a leaf spring 52 extending transversely of the backing plate, approximately medially between the opposite ends thereof. Leaf spring 52 is straight for a substantial part of its length, and at its opposite extremities has arcuate portions 54 engaging against the inner surface of the backing plate, thus to cause the straight, intermediate portion of the spring to be resiliently urged in a direction outwardly from the backing plate against closely spaced, inner side edges of mirror elements 58, 60.

The mirror elements 58, 60 are separated by a divider piece 56 of T-shaped cross section (see Figure 2) the opposite ends of which are integral with the respective longitudinal sides of the mirror frame. The T-shaped cross section of the divider 56 defines along the opposite longitudinal edges thereof outwardly projecting retaining flanges, cooperating with the retaining flange 42 in engaging the peripheral portions of the reflective elements 58, 60.

The spring 52 is aligned longitudinally with the divider 56, the divider extending longitudinally and centrally of the spring and the spring being substantially greater in width than the divider. By reason of this arrangement, the opposite side or longitudinal edge portions of the straight intermediate part of the spring bear against the inner edges of the reflective elements, which edges are engaged against opposite sides of the divider, and thus the single spring presses both the mirror elements outwardly against the oppositely directed side flanges of the divider, at the same time pressing the mirror elements against the marginal flange 42 of the mirror frame 40.

By reason of this arrangement, the mirror elements are supported firmly against vibration within the mirror frame, but at the same time, are not so rigidly supported as to be subject to breakage when the vehicle suffers a heavy shock. The spring, thus, not only serves as means to firmly support the mirror elements in the frame, but also serves as a shock absorber to cushion the mirror elements against heavy shock, in cooperation with the gasket 48.

As shown in Figure 2, that portion of the mirror frame 40 disposed between the divider 56 and one end of the mirror frame lies in a first plane, while the remaining portion of the mirror frame, that is, the part disposed between divider 56 and the other end of the mirror frame, lies in a second plane related at a wide obtuse angle to the first plane and intersecting with the first plane of the divider. The oppositely directed flanges on the divider, in this regard, impart substantial width to the divider at the outer edge thereof, to provide a non-reflective area between the angularly related reflective elements 58, 60 which will assist the vehicle operator in immediately being made aware of the location of the trailing vehicle. In other words, since the reflective elements are separated by a relatively wide divider having no reflective characteristics of its own, said elements will be incapable of being confused by the driver, and the driver will not see the same vehicle in both reflective elements under circumstances which will cause the reflected portions of the trailing vehicle to appear to blend into one another. Instead, the vehicle operator will first see the trailing vehicle in the reflective element 60, which is near the vehicle on which the rear view mirror is mounted, and then, as the trailing vehicle begins to move into the passing lane, he will see the passing vehicle in the reflective element 58. The passing vehicle will not seemingly blend in both reflective elements at one and the same time and in effect two separate views, unrelated to one another, will be had by the user.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A framing structure for a rear view mirror comprising a backing plate, a mirror support frame attached to and extending marginally of said backing plate, a divider extending transversely of and rigid with the frame intermediate opposite ends of the frame, the portion of the frame at one side of the divider lying in a first plane and the portion of the frame at the other side of the divider lying in a second plane angularly related to the first plane, and a single leaf spring mounted against the backing plate in longitudinal alignment with the divider and formed to a width substantially greater than the divider so as to dispose the respective longitudinal edge portions of said spring at opposite sides of the divider.

2. A framing structure for a rear view mirror comprising a backing plate, a mirror support frame attached to and extending marginally of said backing plate, a divider extending transversely of and rigid with the frame intermediate opposite ends of the frame, the portion of the frame at one side of the divider lying in a first plane and the portion of the frame at the other side of the divider lying in a second plane angularly related to the first plane, and a single leaf spring mounted against the backing plate in longitudinal alignment with the divider and formed to a width substantially greater than the divider so as to dispose the respective longitudinal edge portions of the spring at opposite sides of the divider, said spring having an elongated, straight intermediate portion and having arcuate end portions, the end portions of the spring engaging against the backing plate and being tensioned to urge the straight intermediate portion outwardly from the backing plate, toward the divider.

3. A framing structure for a rear view mirror comprising a backing plate, a mirror support frame attached to and extending marginally of said backing plate, a divider extending transversely of and rigid with the frame intermediate opposite ends of the frame, the portion of the frame at one side of the divider lying in a first plane and the portion of the frame at the other side of the divider lying in a second plane angularly related to the first plane, and a single leaf spring mounted against the backing plate in longitudinal alignment with the divider and formed to a width substantially greater than the divider so as to dispose the respective longitudinal edge portions of the spring at opposite sides of the divider, said spring having an elongated, straight intermediate portion and having arcuate end portions, the end portions of the spring engaging against the backing plate and being tensioned to urge the straight intermediate portion outwardly from the backing plate toward the divider, said mirror frame including a peripherally extending, inwardly directed retaining lip, said divider including longitudinal flanges projecting outwardly therefrom in opposite directions and merging into said lip.

4. A framing structure for a rear view mirror comprising a backing plate, a mirror support frame attached to and extendnig marginally of said backing plate, a divider extending transversely of and rigid with the frame intermediate opposite ends of the frame, the portion of the frame at one side of the divider lying in a first plane and the portion of the frame at the other side of the divider lying in a second plane angularly related to the first plane, and a single leaf spring mounted against the backing plate in longitudinal alignment with the divider and formed to a width substantially greater than the divider so as to dispose the respective longitudinal edge portions at opposite sides of the divider, said spring having an elongated, straight intermediate portion and having arcuate end portions, the end portions of the spring engaging against the backing plate and being tensioned to urge the straight intermediate portion outwardly from the backing plate toward the divider, said mirror frame including a peripherally extending, inwardly directed retaining lip, said divider including longitudinal flanges projecting outwardly therefrom in opposite directions and merging into said lip, one flange of the divider being coplanar with the portion of the frame lip at one side of the divider, the other flange of the divider being coplanar with the frame lip portion at the other side of the divider.

5. A framing structure for a rear view mirror, comprising a backing plate, a mirror support frame attached to and extending marginally of said backing plate, a divider extending transversely of and rigid with the frame intermediate opposite ends of the frame, the portion of the frame at one side of the divider lying in a first plane and the portion of the frame at the other side of the divider lying in a second plane angularly related to the first plane, and a single leaf spring mounted against the backing plate in longitudinal alignment with the divider and formed to a width substantially greater than the divider so as to dispose the respective longitudinal edge portions of the spring at opposite sides of the divider, said spring having an elongated, straight intermediate portion and having arcuate end portions, the end portions of the spring engaging against the backing plate and being tensioned to urge the straight intermediate portion outwardly from the backing plate toward the divider, said end portions being substantially shorter in length than the intermediate portion of the spring and being bowed in a direction such that the convex surfaces of the end portions bear against the backing plate, the intermediate portion, when urged downwardly from the backing plate by the end portions, extending in parallel relation to said divider, said spring being substantially coextensive in length with the length of the divider with the intermediate portion extending along the major portion of said length of the divider.

References Cited in the file of this patent

UNITED STATES PATENTS

| D. 142,248 | Latshaw | Ag. 21, 1945 |
| 1,426,010 | Rees | Aug. 15, 1922 |
| 1,533,937 | Mogor | Apr. 14, 1925 |
| 1,895,566 | Bertell et al. | Jan. 31, 1933 |
| 2,168,003 | Stone | Aug. 1, 1939 |
| 2,333,671 | Peters et al. | Nov. 9, 1943 |
| 2,514,989 | Buren | July 11, 1950 |
| 2,705,904 | Tagliaferri | Apr. 12, 1955 |

FOREIGN PATENTS

| 57,034 | Austria | Dec. 27, 1912 |
| 512,812 | Great Britain | Sept. 26, 1939 |